United States Patent [19]

Muramatsu

[11] Patent Number: 5,699,284

[45] Date of Patent: Dec. 16, 1997

[54] THERMAL DESIGN METHOD FOR STRUCTURES AND OPTIMUM NUMERICAL CALCULATION DEVICES FOR SUCH DESIGNS

[75] Inventor: Toshiharu Muramatsu, Higashiibaraki-gun, Japan

[73] Assignee: Doryokuro Kakunenryo Kaihatsu Jigyodan, Tokyo, Japan

[21] Appl. No.: 546,397

[22] Filed: Oct. 20, 1995

[30] Foreign Application Priority Data

Oct. 31, 1994 [JP] Japan .................................. 6-266773

[51] Int. Cl.$^6$ ............................................. G06F 17/10
[52] U.S. Cl. .......................... 364/578; 364/509; 395/500
[58] Field of Search ........................... 364/505, 509, 364/512, 578; 137/554, 486, 3; 434/218; 395/500

[56] References Cited

U.S. PATENT DOCUMENTS

| 5,311,447 | 5/1994 | Bonne ........................... 364/509 |
| 5,524,084 | 6/1996 | Wang et al. ..................... 364/509 |
| 5,594,671 | 1/1997 | Chen et al. ..................... 364/578 |
| 5,606,517 | 2/1997 | Traub et al. .................... 364/578 |

OTHER PUBLICATIONS

Nuclear Engineering and Design, vol. 150, No. 1, Sep. 1994, "Investigation of Turbulence Modelling in Thermal Stratification Analysis", T. Muramatsu et al., pp. 81–93.

JSME International Journal, Series II, vol. 35, No. 4, Nov. 1992, "Thermal Striping Temperature Fluctuation Analysis Using the Algebraic Stress Turbulence Model in Water and Sodium", T. Muramatsu et al., pp. 486–496.

*Primary Examiner*—Kevin J. Teska
*Assistant Examiner*—Tyrone V. Walker
*Attorney, Agent, or Firm*—Oliff & Berridge

[57] ABSTRACT

A design method for structures is invented, taking into account the effects of fluid temperature fluctuations, comprising: numerical calculations of time-averaged solutions for the motion equation and energy equation for fluids; a Process 1 in which the low-cycle components of the temperature fluctuations occurring on the surface of a tentatively designed structure are analyzed; a Process 2 in which an artificial high-cycle component is superimposed on the low-cycle component of the temperature fluctuations; numerical calculations of accurate solutions for the motion equation and the energy equation for fluids, with the new temperature fluctuations obtained from Process 2 serving as boundary conditions; and a Process 3 in which the high-cycle components of temperature fluctuations occurring at structure surfaces are analyzed. Process 1 and Process 3 are performed by a numerical calculation apparatus equipped with a control section to control time step sizes.

14 Claims, 7 Drawing Sheets

THERMAL DESIGN METHOD FOR STRUCTURES AND OPTIMUM NUMERICAL CALCULATION DEVICES FOR SUCH DESIGNS

BACKGROUND OF THE INVENTION

1. Field of the Invention

This invention relates to a thermal design method for structures and the optimum numerical calculation devices for such designs, and in particular to a design method and devices that take into account the effects of the temperature fluctuations of fluids that come into contact with the structures.

2. Related Art

Temperature fluctuations occur in areas where fluids of different temperatures are mixed together. If a structure exists in this area, repeated expansion and contraction of the structure surface due to the temperature fluctuations will occur. In an airplane engine, for instance, the materials of the mechanisms which come into contact with heated gases and coolants are subject to these effects over long spans of time.

Due to the expansion and contraction, irregularly fluctuating thermal stresses in the structure will occur. Since thermal stress usually occurs in the elastic parts of the structure, the frequency of expansion and contraction can attain orders of $10^7$ and above, resulting in so-called high-cycle thermal fatigue. Since cracks in the structure surface may develop depending on the amplitude, period, and frequency of the temperature fluctuations, high-cycle thermal fatigue has been considered to be an important design factor from the perspective of ensuring structural safety.

The problem of high-cycle thermal fatigue is particularly serious in fields where high levels of safety are required in a structure. For instance, in a fast reactor for a nuclear power plant, since high-temperature fuel channels and low-temperature control rod channels are mixed at relatively high velocities in the vicinity of the core exit, an important item in the course of development is structural design that takes into account the effects of the turbulence that occurs in such areas.

When considering the effects of heat in structural design, the velocity of heat flux is an important factor. Where the change in thermal flux over time is small, the orthodox engineering approach applies the time-averaged transport model with satisfactory results. The model solves for time-averaged approximate solutions (i.e., the effective values for the state variables of a fluid) to the Navier-Stokes equation, the motion equation for fluids, and the energy equation for fluids, and describes only the low-cycle component of thermal flux behavior. Therefore, when the model is employed to analyze high-cycle components, engineering models such as the turbulence model are introduced, but since the solution is averaged over time, it is not possible to analyze with precision the high-cycle components with frequencies beyond a certain range. Thus, in practice, the model is not applicable to the fast reactor design mentioned above.

Further, solving for an accurate solution instead of such an approximate solution has also been considered. However, the direct simulations necessary to obtain an accurate solution would require a tremendous amount of computing time since numerical calculations would be necessary which were based on a mesh arrangement fine enough to describe the minute structures in the flow area and which employed time step sizes small enough to describe the behavior of the randomly fluctuating fluid. Therefore, it is difficult even with the aid of today's fastest computers to analyze fluid temperature fluctuations within the entire space of a fast reactor. A further, crucial problem is that even if such a lengthy computation was to be executed, as long as current methods for direct simulation are to be applied, there will be cases where the final solution cannot be attained due to the occurrence of divergent or unstable numerical values during calculations. This happens because while the behavior of the state variables in the flow area should be described in terms of physical vibrations, physically meaningless numerical errors occur in the computational process, since although direct simulation is a method that solves for accurate solutions, mesh calculations performed in the process involve approximating stages which are characteristic to computers.

In short, currently, with respect to structures which are subject to the effects of large fluid temperature fluctuations over time, analytical methods for highly precise structural design are practically non exist. As a result, when newly designing complex structures such as fast reactors, experiments using full size mockups are held to be necessary. As long as numerical analysis cannot be performed, there is no choice but to make evaluations on the basis of direct and reliable experiments.

Problems related to the orthodox technology mentioned above are summarized below from the following three perspectives: (1) deriving an approximate solution from the time-averaged transport model; (2) deriving an accurate solution from direct simulation; and (3) evaluation by means of mockup experiments.

1. Deriving an approximate solution from the time-averaged transport model.

Since this method merely establishes a turbulence model and solves for a time-averaged solution, it cannot describe the high-cycle component of fluid temperature fluctuations with precision. In areas of flow turbulence, it is mainly the high-cycle component of thermal fluctuations that affects high-cycle thermal fatigue. Therefore, the use of a model is meaningful only if the model can afford a high degree of precision. Further, even if it's use on high-cycle thermal fatigue analysis was restricted only to areas with slow thermal flux, as in the orthodox approach, current numerical calculation methods consume too much time. Moreover, since the time step sizes are inappropriate, it is not always possible to arrive at a solution, a problem also encountered in the direct simulation method to be discussed next.

2. Deriving an accurate solution from direct simulation.

A tremendous amount of time is required. Therefore, this method cannot be applied to structures beyond a certain size and degree of complexity. Even if the problem of computing time is tolerated, there will be cases in which solutions cannot be attained due to the divergence or instability of numerical values.

3. Evaluation by means of mockup experiments.

The method is direct and will yield certain results. However, when experimental results are deemed unsatisfactory, design revisions, the construction of a new mockup, and the gathering of new sets of data are necessary. Design revisions are owed largely to trial and error, and the decision on a final structure often consumes much time and effort. To design a fast reactor, for instance, several years of experimenting and several hundred million yen's worth of funding would be necessary. Further, in designing a very large structure, it is often difficult to construct full size mockups. Errors which go hand in hand with experiments is another problem, and, naturally, any compromises made in the construction of the mockup will also compromise the reliability of the experimental data.

SUMMARY OF THE INVENTION

In view of the problems discussed above, the purposes of this invention are classified below into several steps:

1. In deriving an approximate solution from the above-mentioned time-averaged transport model, to provide a numerical calculation device that reduces computing time.

2. In deriving an accurate solution from the above-mentioned direct simulation, to provide a numerical calculation device that makes the reduction of computing time and the stabilization of numerical values possible.

3. In any given area of flow, to provide a method of analysis particularly with respect to the thermal design of structures in areas of flow turbulence. Here, a design method that greatly reduces design evaluation time by jointly employing the numerical calculation devices of both (1) and (2) above is disclosed.

In other words, the invention, with respect to complex structures affected by fluid temperature fluctuations, establishes and discloses an analytical method for thermal design, and provides optimum numerical calculation devices for the implementation of said method. The purpose of the invention is to make it possible to discontinue mockup experiments, reduce designing time and cost, eliminate uncertain factors in experiments, grasp numerically the amount of leeway offered by a design, and accumulate know-how for the sake of future designs.

In order to achieve this object, the present invention provides a thermal design method for structures. This method comprises numerically calculating time-averaged solutions of a motion equation and an energy equation for fluids to primarily analyze a low-cycle components of fluctuations in fluid temperature, said fluctuations occurring within space of a tentatively designed structure, superimposing an artificial high-cycle component on the low-cycle component of the fluctuations in fluid temperature obtained by the primary analysis to obtain new fluid temperature fluctuations, and numerically calculating accurate solutions of a motion equation and an energy equation for fluids, using the new fluid temperature fluctuations obtained by the superimposition as boundary conditions, to secondarily analyze a high-cycle components of the fluctuations in fluid temperature occurring at any points of interest within the space of the structure, thereby generating information on temperature fluctuations at structure surfaces so as to design a structure taking into account effects of fluid temperature fluctuations.

In accordance with this method, based on information on the form of the tentatively designed structure obtained by the primary analysis step, numerical calculations are performed to derive time-averaged solutions of the motion equation and the energy equation for fluids that come into contact with the structure. As a result, the low-cycle components of the fluid temperature fluctuations that occur within the space of the structure are analyzed. Next, in the superimposition step, an artificial high-cycle component is superimposed on the low-cycle component of the fluid temperature fluctuation. This superimposition is based on empirically established rules on the behavior of fluid temperature fluctuations. In the secondary analysis step, the new fluid temperature fluctuations thus derived are employed as boundary conditions, and numerical calculations are performed to obtain accurate solutions to the motion equation and the energy equation for fluids, and the high-cycle component of the fluid temperature fluctuations occurring at each point of interest within the space of the structure is analyzed. Through these steps, information on the thermal fluctuations at structure surfaces necessary for the evaluation of the thermal fatigue occurring in structures can be generated with precision.

The above-mentioned superimposition step includes superimposition of a high-cycle component artificially generated from a series of random digits on the low-cycle component of the fluctuations in fluid temperature obtained by the primary analysis step. The grounds for this is the fact that high-cycle components are white noise, and thus the superimposition makes it possible to compute the high-cycle components with precision.

In another aspect of the invention, a numerical calculation apparatus for analyzing fluid temperature fluctuations that occur within space of structures. This apparatus comprises storage sections for storing a turbulence model approximately expressing a behavior of turbulence as well as storing a motion equation and an energy equation for fluids which govern the behavior of turbulence, calculation sections for performing iterative computation of state variables of a flow area, in accordance with the turbulence model and the motion equation and the energy equation for fluids stored in the storage section, the iterative computation providing a new state variable based on the current state variable, with a given time step size between the new state and the current state, and a control section for controlling said time step size, in accordance with the state variables calculated by the calculation sections, thereby performing numerical calculations for time-averaged solutions to the motion equation and the energy equation for fluids to analyze the fluid temperature fluctuations.

A turbulence model and the motion equation and the energy equation for fluids, the two equations governing the behavior of fluids, are temporarily stored in the storage section. Next, in accordance with the turbulence model and the motion equation and the energy equation for fluids, iterative computation of the state variables of a flow area are performed by the computing section, the iterative computation providing a new state variable based on the current state variable, with a given time step size between the new state and the current state. Here, in accordance with the behavior of the state variable which is continuously changing, the time step sizes are controlled in order to optimize the computing time as well as the stability of numerical values during computation.

In another aspect of the invention, a numerical calculation apparatus for analyzing fluid temperature fluctuations that occur within space of structures. This apparatus comprises storage sections for storing a motion equation and an energy equation for fluids which govern the behavior of turbulence, calculation sections for performing numerical calculations, through direct simulation, to solve the motion equation and the energy equation which have been stored in the storage section, and based on calculation results, for performing iterative computation of the state variables of a flow area to provide a new state variable based on the current state variable, with a given time step size between the new state and the current state, and a control section for controlling the time step size, in accordance with the state variables calculated by the calculation sections, thereby performing numerical calculations for accurate solutions to the motion equation and the energy equation for fluids to analyze the fluid temperature fluctuations.

The motion equation and the energy equation for fluids which govern the behavior of flow areas are stored temporarily in the storage section. Subsequently, in accordance with these equations, iterative computation of the state variables of a flow area are performed, through direct simulation, by the computing section, the iterative computation providing a new state variable based on the current state variable, with a given time step size between the new state and the current state. Here, in accordance with the behavior of the state variable which is continuously changing, the time step sizes are controlled in order to optimize the computing time as well as the stability of numerical values during computation.

The above-mentioned control section may comprise a fuzzy control section for controlling the time step size in accordance with the relative variation of the state variables calculated by the calculation section, an inference section for inferring in advance locations of areas in which physically meaningful vibrations may occur, using general rules related to fluid behavior, and an adjustment section for adjusting the time step size, only when vibrations appear in state variables during the calculations for those areas which have not been inferred by the inference section as the areas in which the physically meaningful vibrations may occur. As a result, the elimination of physically meaningless vibration components can be attempted.

DESCRIPTION OF THE PREFERRED EMBODIMENTS

Embodiment 1

The EMBODIMENT relates to a numerical calculation device that shortens the computing time for the above-mentioned time-averaged transport model.

Figure 1:
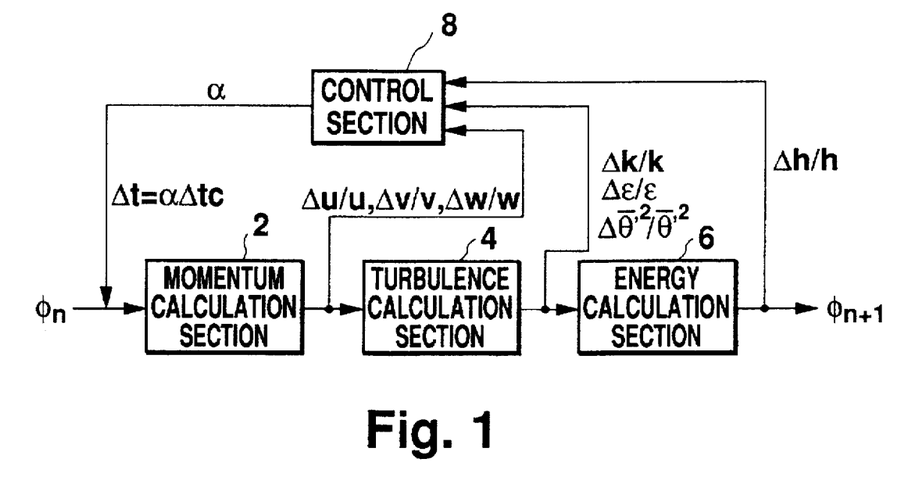
FIG. 1 Block diagram showing the components of the numerical calculation device related to EMBODIMENT 1.

FIG. 1 shows a block diagram of the components of the numerical calculation device. The components of said device will be explained using this diagram.

As shown in the diagram, said device has a momentum calculation section 2, a turbulence calculation section 4, and an energy calculation section 6 which respectively calculate a fluid's state variables, namely, momentum, turbulence and energy, at any given moment. What is notable here is that since said device approximates the effects of turbulence, the turbulence calculation section exists independent of the momentum calculation system. In other words, if an accurate solution instead of an approximate solution is required, the turbulence calculation will be inseparable from the momentum calculation section 2.

The state variables calculated by the three calculation sections are represented by the character $\phi$, and the state variable at time tn is written as $\phi n$. Thus, said device can be described as a device that takes an input $\phi n$ of a given moment and calculates for $\phi n+1$, then further calculates for $\phi n+2$, in loop fashion.

The state variable calculations performed by said device are in accordance with the Navier-Stokes equation expanded for numerical analysis and the energy equation for fluids, etc. In order to derive a time-averaged solution that takes into account the effects of the high-cycle component, a turbulence model is used. Not only the k-$\epsilon$ model, the linear time model generally used in orthodox engineering, but the algebraic stress model or the Reynolds stress model with their more precise quadratic approximations can also be used.

The above describes the components of the calculation section of said device. However, the characteristics of said embodiment is in the control section 8 which controls the value of the time step size $\Delta t$ of the calculation from moment to moment.

The control section 8 keeps constant watch over $\Delta\phi/\phi$, the relative variation of the state variables, and is a type of fuzzy controller which maintains the optimum time step size $\Delta t$. Here, $\Delta\phi$ is defined as:

$$\Delta\phi n=(\phi n+1-\phi n)/\phi n,$$

and $\Delta t$ is determined using the equation $$\Delta t=\alpha\cdot\Delta tc.$$

$\Delta tc$ is a fixed value that serves as a basis for the time step size, and $\alpha$ is called a relaxation factor, which is a control parameter falling within the range from 0 to 1 that is determined by the control section 8. The control section 8 refers to the following numerical values in determining relaxation factor $\alpha$:

a. from the momentum calculation section 2, the relative variation of the momentum in directions x, y, and z of the fluid, respectively:

$$\Delta u/u, \Delta v/v, \Delta w/w;$$

b. from the turbulence calculation section 4, the kinetic energy of the turbulence, the rate of dissipation of kinetic energy, and the relative variation of the amplitude of the temperature fluctuations, respectively:

$$\Delta k/k, \Delta\epsilon/\epsilon, \Delta\theta^{-2}/\theta^{-2}$$

c. from the energy calculation section 6, the relative variation of enthalpy:

Δh/h.

When the relative variation Δϕ/ϕ of all the above factors converge on 0, each state variable ϕ is solved.

Although the main function of the control section 8 is to control relaxation factor α, when the convergence of the relative variation or the numerical stability is poor in spite of the controlling of relaxation factor α, an adaptive function is also provided in which the membership function itself which is used by the fuzzy controller is adjusted, as explained below.

The functions of the above-mentioned construction are explained below.

First, the state variable ϕn at a given moment is inputted to the momentum calculation section 2. The momentum calculation section 2, the turbulence calculation section 4, and the energy calculation section 6 perform calculations to obtain a time-averaged approximate solution, outputting the state variable ϕn+1. ϕn+1 is again inputted to the calculation section, and the state variable calculations are performed moment by moment. In the process, the control section 8 evaluates the numerical stability of the state variables on the basis of the relative variation of each state variable, and controls the relaxation factor α on the basis of the following rules:

(a) If the relative variation is negative and very large, change α to a very large value.

(b) If the relative variation is negative and large, change α to a large value.

(c) If the relative variation is negative and medium, maintain the present α value.

(d) If the relative variation is positive and large, change α to a small value.

(e) If the relative variation is positive and very large, change α to a very small value.

These rules were determined on the basis of the following empirically established rules. Relative variation is large when the numerical value is far from the solution, and during this time α should be kept small so as to deal with the large variation. On the other hand, as the relative variation approaches the solution, the convergence value can be reached quickly with large time step sizes.

Though this set of rules can be implemented with ease when there is only one state variable, since the solution that is being sought involves several state variables, a certain number of analytic processes are necessary to determine α from the several relative variations. The processes are explained with the help of diagrams.

Figure 2:
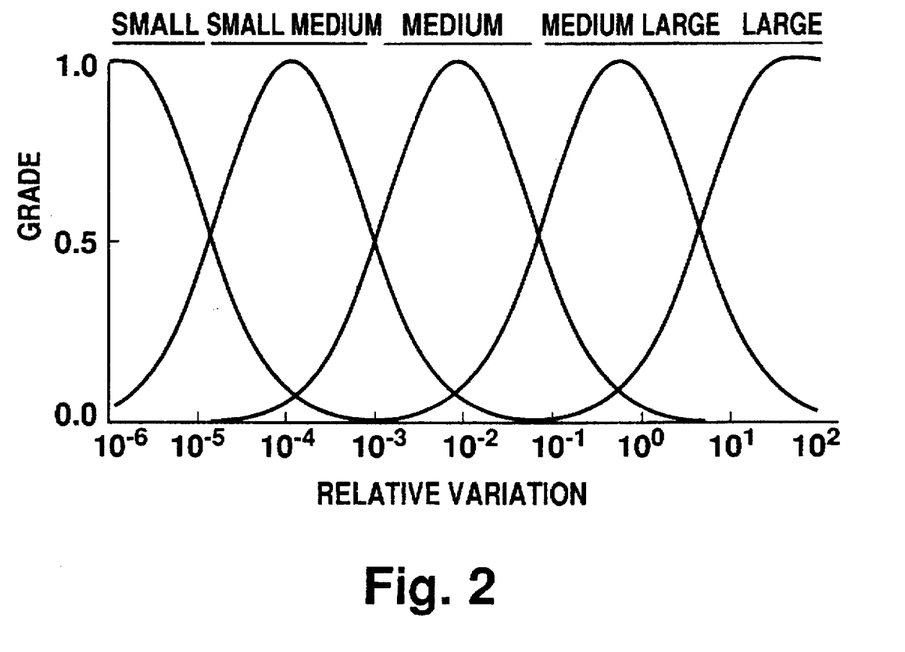
FIG. 2 Diagram showing the membership function used to evaluate by means of a fuzzy set the size of the relative variation of state variable $\phi$.
Figure 3:
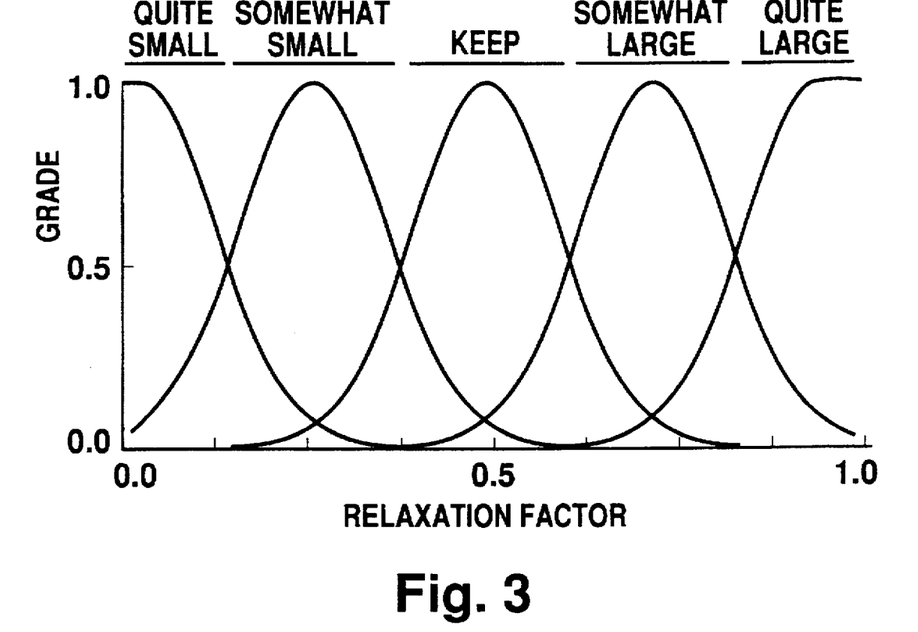
FIG. 3 Diagram showing the membership function used to evaluate the size of relaxation factor $\alpha$.

FIG. 2 shows a membership function which is used to evaluate by means of fuzzy convergence the relative variation of a state variable ϕ. Relative variation is plotted on the horizontal axis, and the grade is plotted on the vertical axis. The horizontal axis is divided into five sections in a Gaussian profile, with the sets for "small," "small medium," "medium," "medium large," and "large" plotted respectively from left to right. FIG. 3 shows the membership function used to evaluate the size of relaxation factor α, with α on the horizontal axis and the grade on the vertical axis. The horizontal axis is divided into five sections in a Gaussian profile, with the sets for "quite small," "somewhat small," "keep," "somewhat large," and "quite large" plotted respectively from left to right.

For instance, if only two relative variations Δu/u and Δw/w are considered, given the following conditions:

Δu/u: the relative variation is negative and medium (with a grade of 0.6)

Δw/w: the relative variation is positive and quite large (with a grade of 0.8), then the former yields "keep the present α," while the latter yields "set α at a quite small value."

Figure 4:
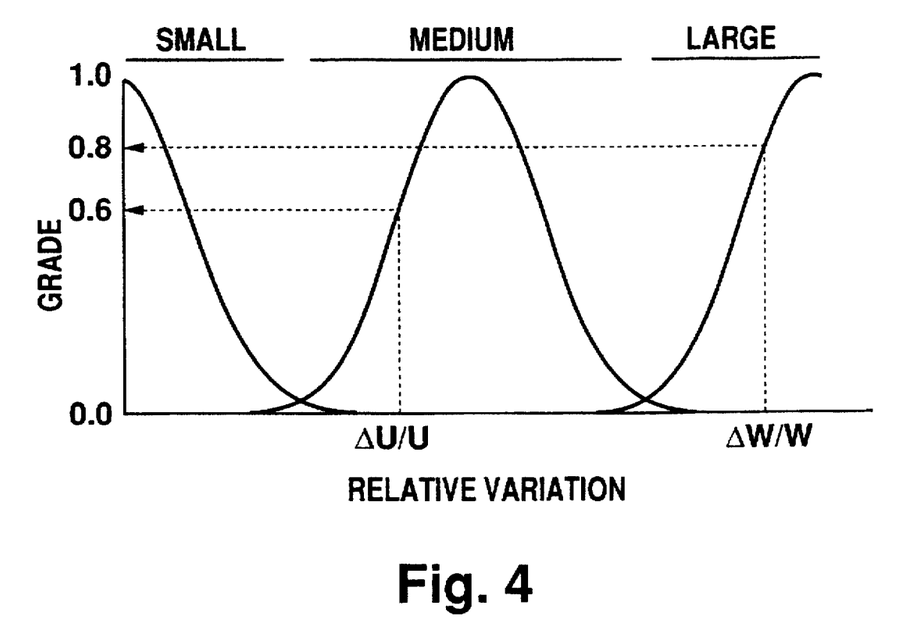
FIG. 4 Diagram showing the conversion of the size of relative variation to numerical stability.
Figure 5:
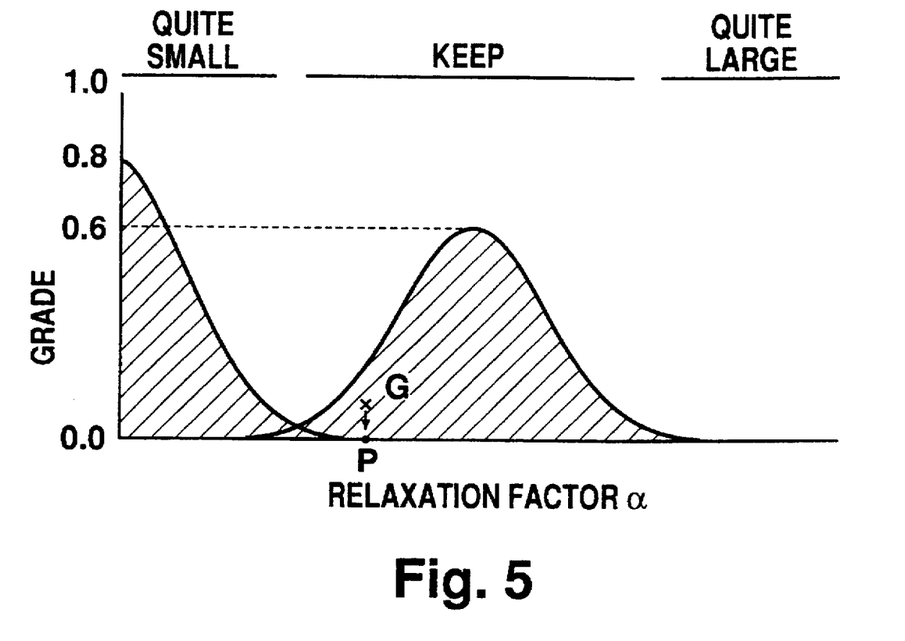
FIG. 5 Diagram showing the relationship between relative variation and $\alpha$.

FIG. 4 shows a graph in which the size of the relative variation has been converted to express numerical stability, and shows the loci of Δu/u and Δw/w. If relative variation is medium, the current α should be kept, while if relative variation is large, then small α should be applied. The relationship between the relative variations and α is shown in FIG. 5. Here, it should be noted that in making the conversion from FIG. 4 to FIG. 5, the respective grades were weighted. In FIG. 5, α is determined as follows: The center of gravity G of the area formed by the union of the two areas of the "keep" set and the "small" set in FIG. 5 is calculated and projected onto the base set. The resulting point P gives the value for α.

In this example, the explanation involves two relative variations. Cases with three or more relative variations can be solved in a similar manner. In any event, by controlling α with the control section 8, not only is considerable time reduction possible in comparison to prior methods, but problems such as numerical divergence encountered with prior methods that base their calculations on a fixed time step size Δtc have been practically eliminated.

Next, a second function of the control section 8 will be explained.

Figure 6:
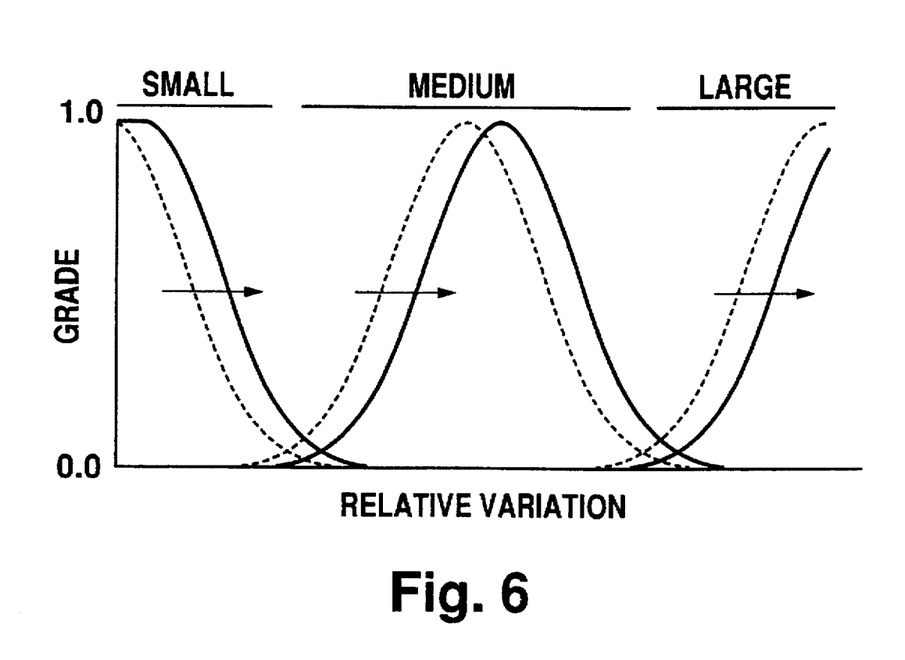
FIG. 6 Diagram showing the sliding of the membership function shown in FIG. 2.

By optimum control of relaxation factor α, the control section 8 aims to facilitate numerical analysis. However, when numerical stability or convergence is unsatisfactory despite the control, the adaptive function of the control section 8 is used. This function keeps a constant watch over the slope of the relative variation, and when the improvement of the slope falls below a certain threshold, the membership function shown in FIG. 2 is slid for the base set. FIG. 6 shows the result of sliding the membership function of FIG. 2. Here the control parameter is the amount of sliding. For each amount slid, the control section 8 records the degree of improvement in the slope of the relative variation, and optimizes the slide amount. In other words, the control section 8 is also equipped with an adaptive function. This concludes the summary of the numerical calculation device related to EMBODIMENT 1.

Figure 7:
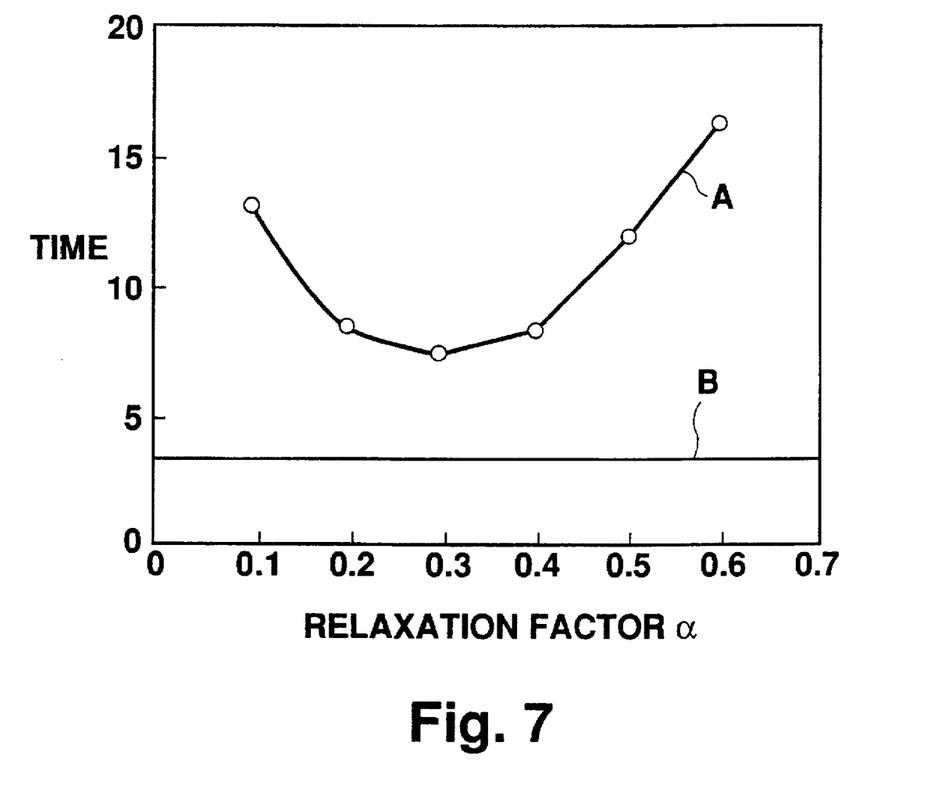
FIG. 7 Diagram showing the time taken to obtain a time-averaged solution for region in the vicinity of the fast reactor's core exit.

Several mathematical models can be used as the calculation method for the calculation section of said device, such as:

(a) numerical calculation method: finite difference method (b) time integral method: revised ICE method (c) convective term evaluation: QUICK method The actual computing time taken by a supercomputer to find the time-averaged solution for the area in the vicinity of the core exit of a fast reactor using these calculation methods is shown in FIG. 7. In the graph, curve A shows the time needed to solve for different α's (fixed value) using said device without resorting to the functions of the control section 8, whereas curve B shows the time needed when the functions of the control section 8 were applied. Curve B is shown as a straight line because α ranges from 0 to 1. While from seven to sixteen hours were needed without the control section 8, use of the control section 8 resulted in an improvement reducing the hours needed to approximately 3 hours.

Embodiment 2

A numerical calculation device which, like EMBODIMENT 1, makes it possible to reduce computing time and derive a stable solution is explained. The components of EMBODIMENT 2 are similar to that of EMBODIMENT 1; however, EMBODIMENT 2 is a direct simulation device that solves not for a time-averaged solution but for an accurate solution, and therefore differences to that effect exist.

Figure 8:
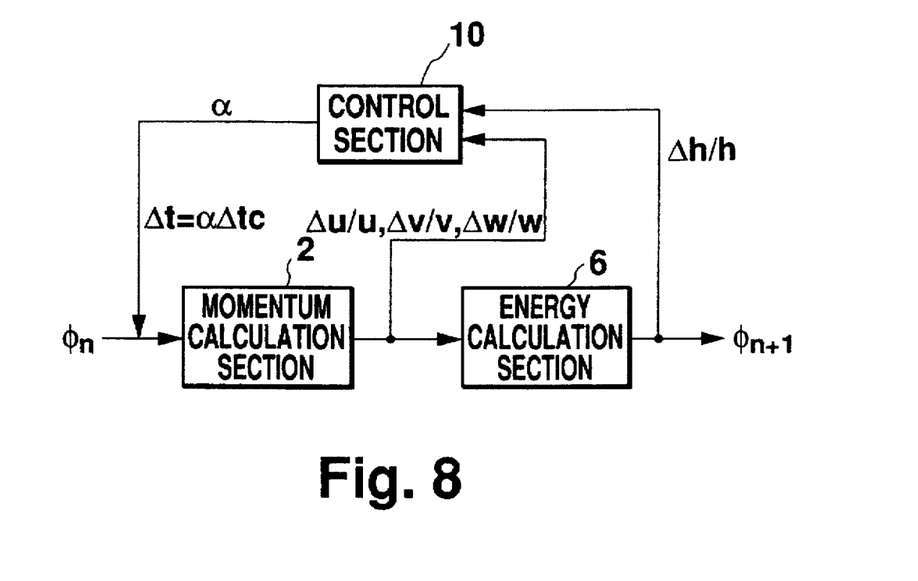
FIG. 8 Block diagram of the numerical calculation device of EMBODIMENT 2.

FIG. 8 is a block diagram that shows the components of the numerical calculation device of EMBODIMENT 2. Using this diagram, the differences in the components of said device and those of the device of EMBODIMENT 1 will be explained in main. Components common to both devices have been marked with the same symbol.

As shown in the diagram, said device also has a momentum calculation section 2 and an energy calculation section 6 to calculate the respective state variables of the fluid, namely, the momentum and the energy, at a given moment,. However, the turbulence calculation section 4 that was necessary in EMBODIMENT 1 does not exist here. This is because since said device treats the effects of turbulence not by approximation, but by directly solving the Navier-Stokes equation for each time and location, the turbulence calculations cannot be separated from the momentum calculation section 2. Thus, a turbulence model is also unnecessary.

Further, said device has a control section 10 with functions which differ from EMBODIMENT 1. The control section 8 of EMBODIMENT 1 has as its functions the controlling of relative variation $\alpha$ and the sliding of membership functions; in contrast, the control section 10 of said device uses empirically established rules and common sense knowledge as rules for controlling relative variation $\alpha$.

The operations of the components described above are explained below.

The basic operations of said device are the same as those for the device in EMBODIMENT 1. However, this device deals with the physical phenomena of random high-cycle vibrations, and must therefore be considered differently from EMBODIMENT 1. In other words, although said device solves for an accurate solution, as long as the calculations are made for mesh cells with finite sizes, approximations or errors will occur. Such errors have undesirable effects that cannot be ignored in the analysis of turbulence. This is because microscopic high-cycle vibrations in the turbulent area, that is physically meaningful vibrations (physical vibrations) are joined by physically meaningless vibrations caused by calculation errors (numerical vibrations), and in a worst case scenario, divergence of numerical values may occur during calculations.

Thus, the control section 10 of said device makes an initial qualitative inference to determine the possible flow geometries given the shape of a certain structure and predict the areas where physical vibrations might possibly occur. Vibrations occurring in areas other than the anticipated areas are judged to be numerical vibrations, and attempts are made to eliminate them by adjusting relaxation factor $\alpha$.

This function of control section 10 is based on empirically established rules and common-sense knowledge in hydrodynamics. The four common-sense rules programmed into control section 10 are:

1. Fluid flows from inlet to outlet.
2. Fluid flows along a solid wall.
3. The normal velocity to the solid wall is zero.
4. Momentum changes its direction in the presence of obstacles in the downstream direction.

Control section 10 uses the four rules to make qualitative inferences about the fluid, and to guess the possible areas where physical vibrations might occur.

An instance of qualitative inference is explained using a diagram.

Figure 9:
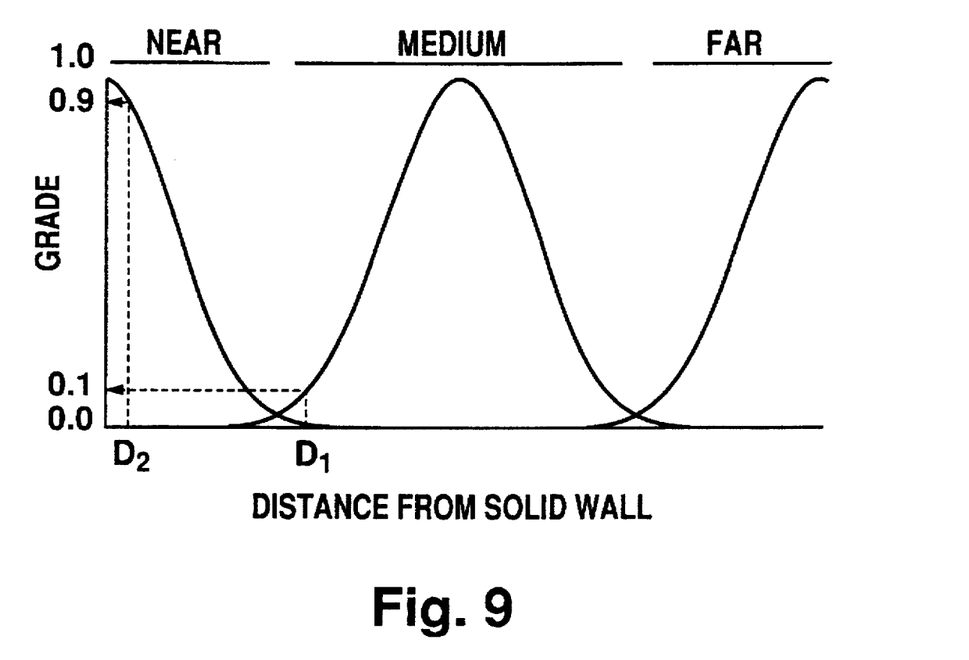
FIG. 9 Diagram showing the membership function for evaluating distance from a solid wall.
Figure 10:
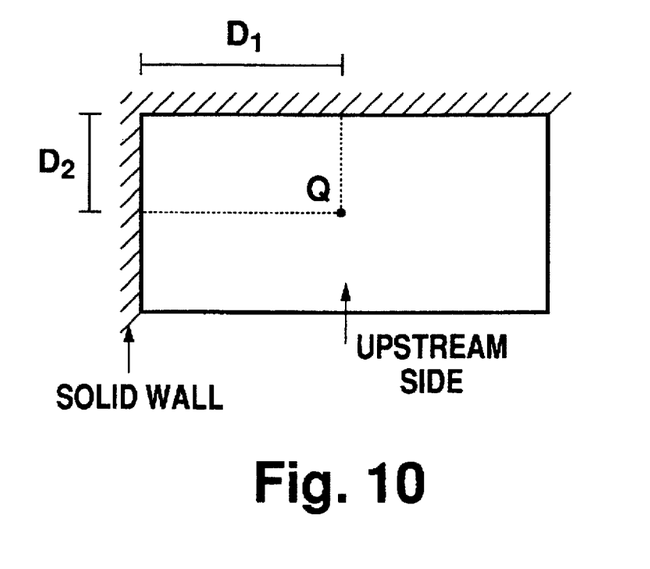
FIG. 10 Diagram showing an area used in inference.

FIG. 9 shows a membership function used to evaluate the distances from solid walls. The horizontal axis shows the distances from the solid walls, and the vertical axis shows the grade. The sets "near," "medium," and "far" are plotted on the horizontal axis according to their distances from the solid wall, starting with "near." FIG. 10 shows the area for the inference. Here the point Q which is at distances D1 from the left wall and D2 from the upper wall will be examined for the effects of the solid walls.

Based on the above assumptions, points D1 and D2 are judged as follows from FIG. 9:

(a) D1: Medium, with grade of 0.1
(b) D2: Near, with grade of 0.9

Figure 11:
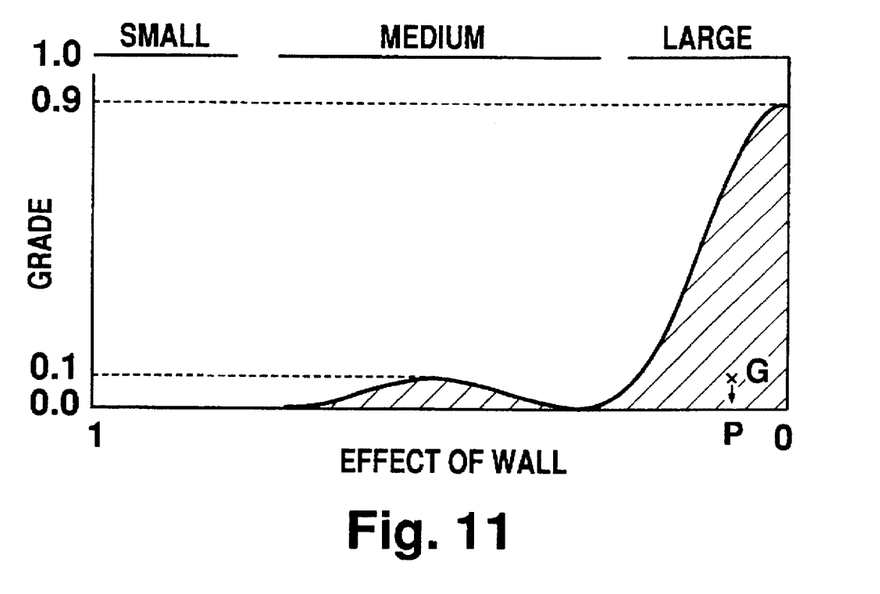
FIG. 11 Diagram showing the effect of a solid wall expressed by converting the weighted distance from the solid wall.

Based on this, the distances from the solid walls are weighted and converted to express the degree of effect from the solid walls, giving the graph in FIG. 11. In FIG. 11, the sets "small," "medium," and "large" are plotted in order of size of effect, starting with "small." As in EMBODIMENT 1, the center of gravity G for the shaded area in FIG. 11 is calculated and projected onto the base set. The point P thus obtained gives the effect of the solid walls.

Next, starting from the upstream side, the flow direction in each calculation cell is determined and weighted with the wall effect from FIG. 11, and the vorticity in each cell is obtained. Based on the vorticity, the areas where physical vibrations may occur are inferred. Vibrations occurring where physical vibrations cannot possibly occur are deemed to be numerical vibrations, and the relaxation factor $\alpha$ is changed in order to eliminate the error component.

In this example, an area bounded by two solid walls is explained. For areas bounded by three or more solid walls, the same approach can be applied. In any case, through the qualitative inference of control section 10, the problem of numerical divergence experienced in prior devices is solved.

This concludes the summary of the numerical calculation device related to EMBODIMENT 2.

Several mathematical models can be used as the calculation method for the calculation section of said device, such as:

(a) The numerical calculation method: the finite difference method
(b) The time integral method: the Leap-Frog method
(c) Convection term evaluation: the tertiary windward finite difference method By employing these calculation methods in said device, engineering problems involving the behavior of high-cycle temperature fluctuations, which were thought to be impossible to solve, can be evaluated with a high degree of accuracy using existent computing resources.

Embodiment 3

EMBODIMENT 3 of the invention is explained below.

EMBODIMENT 3 makes use of the devices described in EMBODIMENT 1 and EMBODIMENT 2 and relates to a method for the analytic design of structures in any given flow area. First, in order to understand the process flow of EMBODIMENT 3, the empirical facts related to temperature fluctuations are explained.

In general, when fluids of different temperatures are mixed, the fluid temperature fluctuations in the mixing area have the following characteristics:

Characteristic 1: The low-cycle component of the fluid temperature fluctuations is dominant.

Characteristic 2: The statistical characteristics of the high-cycle component of the fluid temperature fluctuations conform to those for white noise.

For instance, in the vicinity of the core exit of a fast reactor, high-temperature sodium fuel and low-temperature coolant mix together. The flow velocity of each fluid is approximately 7 meters per second. In this case, past experimental data indicates that the contribution of vibrations in the order of 0 to 20 hertz to the fluid temperature fluctuations occurring in the mixing flow area is extremely large, whereas the contribution of vibrations exceeding 20 hertz is extremely small and remains at a constant level.

Figure 12:
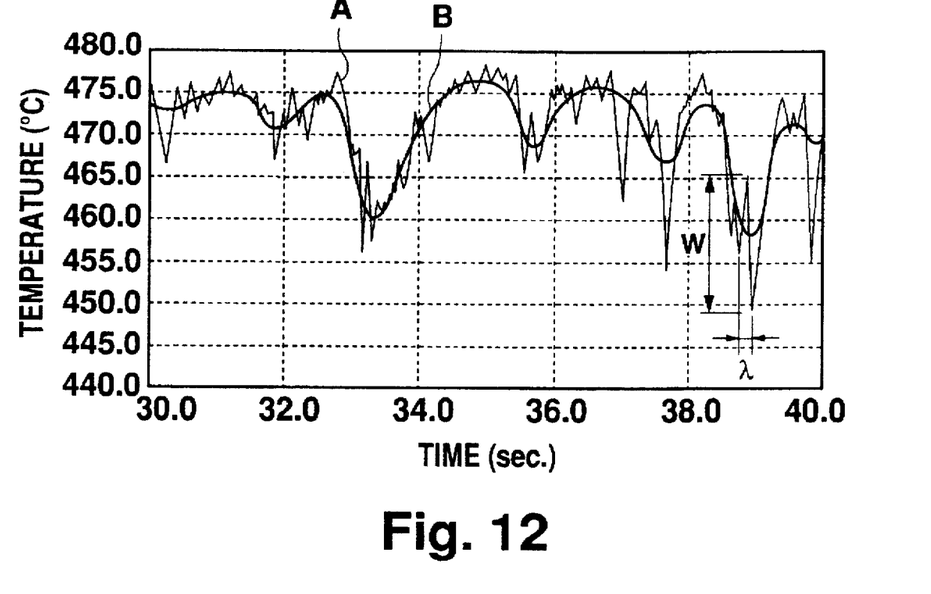
FIG. 12 Diagram showing temperature fluctuations occurring in sodium fuel in the mixing flow area.

Temperature fluctuations occurring in the sodium fuel at the mixing flow area is explained using FIG. 12. In the figure, the horizontal axis shows time, and the vertical axis shows temperature. Curve A is a description of actual temperature observations, and curve B was obtained by averaging the component in A which was causing the fine vibrations, namely, the high-cycle component, and bringing out the low-cycle component which forms the basis of temperature fluctuations. λ is a specimen of the high-cycle component's wavelength, and the frequency can be determined from its reciprocal. W is an example of the high-cycle component's amplitude.

As shown in the figure, although the actual fluid temperature fluctuations appear to be completely irregular in behavior, on the whole, the low-cycle component shown by curve B is dominant, and the shape of the fluctuations is the result of superimposing the random high-cycle component, or white noise, on the low-cycle component. This high-cycle component occurs completely randomly, reaching an order of several kilohertz. This illustrates the above-mentioned characteristics 1 and 2.

From characteristics 1 and 2, it can be seen that fluid temperature fluctuations can be analyzed by performing calculations separately for the low-cycle components and the high-cycle components of the fluctuations. Therefore, in EMBODIMENT 3, the low-cycle component is described as a time-averaged solution, to which a random high-cycle component is artificially superimposed. The synthesized vibrations are used as boundary conditions for recalculation, with an aim to obtain an accurate solution. Here, the optimum methods for obtaining a time-averaged solution and an accurate solution are provided by the numerical calculation devices of EMBODIMENT 1 and EMBODIMENT 2, respectively.

Figure 13:
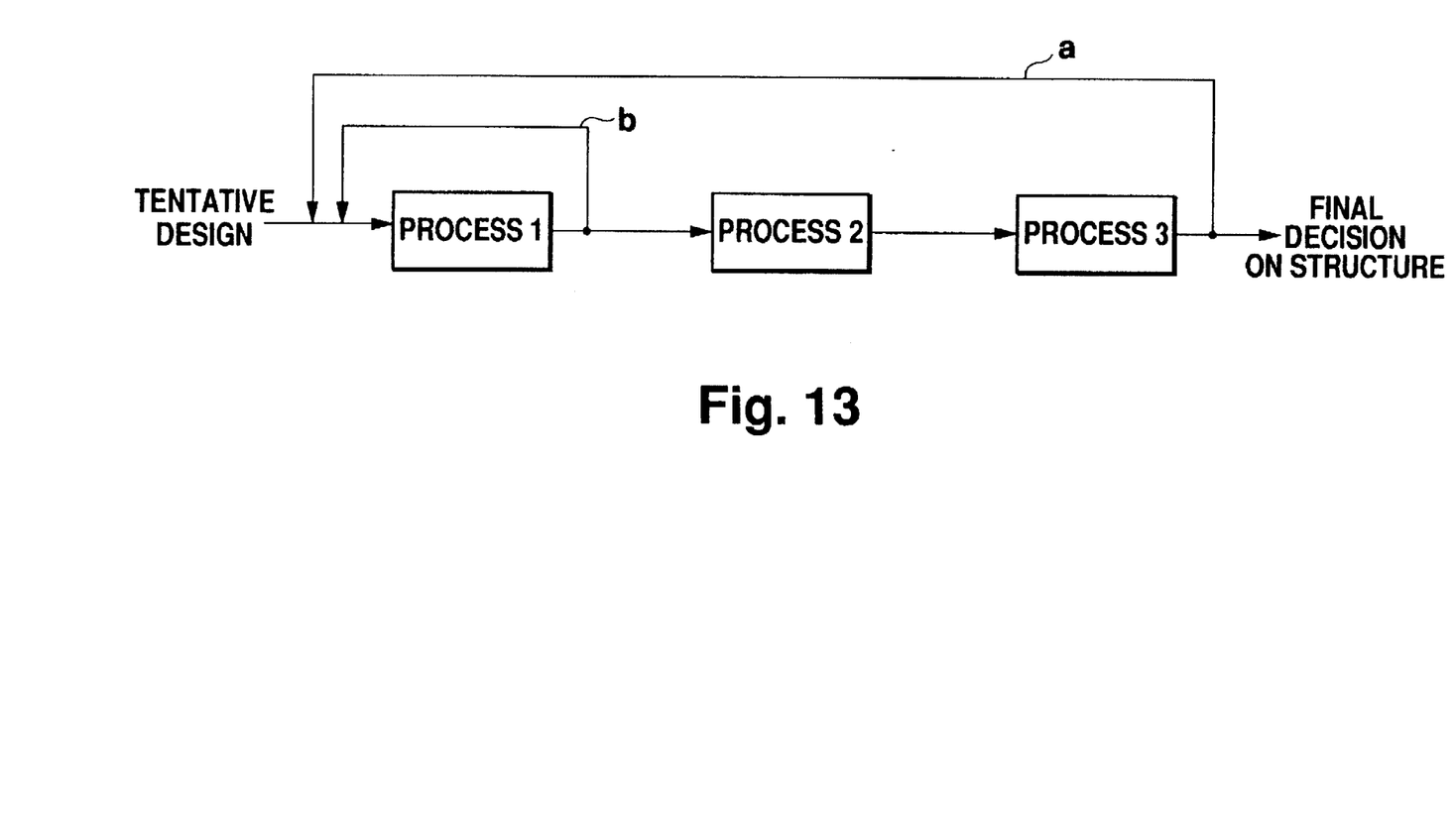
FIG. 13 Flowchart for the design method of EMBODIMENT 3.

Based on the above discussion, each process in the design method of EMBODIMENT 3 is explained. The structural design of a fast reactor will be used as an example to explain said embodiment. FIG. 13 is a flowchart of the design method. The design method consists of the following procedures.

Procedure 1: Determining the characteristics of the low-cycle temperature fluctuations.

First, a tentative design for the structure is made. Next, the time-averaged solution for the Navier-Stokes equation is calculated using EMBODIMENT 1 or an equivalent device, yielding the low-cycle component of the fluid temperature fluctuations occurring within the space of the tentatively designed structure.

Procedure 2: Superimposition of the high-cycle component. An artificial high-cycle component is superimposed on the low-cycle component of the fluid temperature fluctuations obtained in Procedure 1. The randomness of the high-cycle component is imitated using arithmetical random digits. In other words, both the amplitude and frequency of the high-cycle component are generated using random numbers. The upper limit for the frequency is adjusted to several kilohertz. The result is a new model that can be used in Procedure 3.

Procedure 3: Determining the characteristics of the fluid temperature fluctuations.

By means of EMBODIMENT 2 or an equivalent device, numerical calculations are performed in order to obtain an accurate solution to the Navier-Stokes equation, using the fluid temperature fluctuations of the model obtained from Procedure 2 as boundary conditions. As a result, fluid temperature fluctuations that accurately reflect the effects of the high-cycle component can be obtained.

The above is the design method related to EMBODIMENT 3. When actually designing a structure, the results obtained from Procedure 3 are used as a basis for the calculation of temperature fluctuations on the structure surface, and the thermal stress occurring as a result of the temperature fluctuations is used to evaluate thermal fatigue. When the results of the evaluation are not desirable, the shape of the structure is modified, and the process proceeds along route a in the figure to repeat procedures 1 through 3, thus evaluating the suitability of the structural design. However, in practice, by making a preliminary evaluation after the completion of Procedure 1 (route b in the figure), design time can be reduced. In other words, based on the approximate solution of Procedure 1, locations on the structure surface where the occurrence of thermal fatigue is predicted can be selected, and procedures 2 and 3 can be executed for these selected spots only. This preliminary evaluation is appropriate to a certain extent given the fact that low-cycle components are dominant in fluid temperature fluctuations and the fact that high-cycle components occur randomly. In other words, the invention makes time reduction possible by analyzing empirical facts about fluid temperature fluctuations and developing a method that distinguishes between the low-cycle component and the high-cycle component.

EMBODIMENT 3 deals with both the low-cycle and high-cycle components. The reason why this is indispensable for high-precision analysis is explained. Although the low-cycle component dominates in fluid temperature fluctuations, the effects of the high-cycle component are greater in high-cycle thermal fatigue. Further, the transfer of energy from the low-cycle component to the high-cycle component must also be considered. Therefore, an analysis involving only one of the two components would be incomplete. Prior design methods only solved for a time-averaged solution based on a turbulence model, and were thus unable to generate accurate information necessary for the evaluation of high-cycle thermal fatigue. The accurate information necessary is provided for the first time by the design method of EMBODIMENT 3.

The explanation of EMBODIMENT 3 refers to the design of a fast reactor as an example; however, the design method naturally is not restricted to fast reactor design. The invention has an extremely wide range of applications, ranging from large-scale structures including thermoelectric power plants, chemical plants, steel manufacturing plants, space structures, and various other thermal facilities to electronic elements that are affected by temperature fluctuations.

As has been explained in detail above, the thermal design method for structures related to the invention, by taking note of the fact that the low-cycle components and the high-cycle components of fluid temperature fluctuations can be separated, makes it possible to analyze the high-cycle components of fluid temperature fluctuations, which could not be accurately calculated with prior methods. The procedures are divided in accordance with the separation of fluid temperature fluctuation components, first obtaining the low-cycle component, then superimposing an artificial high-cycle component in order to obtain an accurate solution, thus providing a method for the analysis of high-cycle components of flow areas, where such methods can be said to have been previously non-existent in the field of engineering. Further, since a preliminary evaluation is possible after the low-cycle component has been obtained, the invention paves the way to practical analysis by accurate solutions, a method that prior to this suffered serious drawbacks due to computing time.

Further, the thermal design method for structures related to the invention focuses on the fact that the above-mentioned high-cycle component is white noise, disclosing an epoch-making method in which a series of random numbers are used to describe said component. Since this method of description makes it possible to treat the high-cycle component in an analytical manner, it allows for the realization of extremely superior design reproducibility and reliability.

Further, by using the two types of numerical calculation devices related to the invention, owing to the optimum control of time step sizes for the calculations, reductions in computing time, improvements in computing precision, and numerical stability can be realized in calculations for approximate and accurate solutions to the motion equation and the energy equation for fluids. Therefore, by introducing computing science into the field of thermal design where the practical use was thought to be difficult, the invention makes the design of complex and large-scale structures within the scope of existent computing capabilities possible.

Thus, by a combination of the thermal design method and the numerical calculation devices related to the invention, mockup experiments which were previously held to be necessary in structural design have been rendered unnecessary, and the optimization of designs can be realized with ease. For instance, the design of a fast reactor for a nuclear plant which usually requires several years of experimentation and several hundred million yen in funding for such experimentation can be evaluated within a time span of several months and at a cost of several million yen. Further, by eliminating the need for experimentation, and therefore eliminating the need to consider the inevitable elements of uncertainty and measurement errors, the reliability of designs can be improved. The invention has a wide range of engineering applications, and its effects are considerable.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A thermal design method for structures comprising steps of:
   numerically calculating time-averaged solutions of a motion equation and an energy equation for fluids to primarily analyze a low-cycle component of fluctuations in fluid temperature, said fluctuations occurring within space of a tentatively designed structure;
   superimposing an artificial high-cycle component on the low-cycle component of the fluctuations in fluid temperature obtained by the primary analysis to obtain new fluid temperature fluctuations; and
   numerically calculating accurate solutions of a motion equation and an energy equation for fluids, using the new fluid temperature fluctuations obtained by the superimposition as boundary conditions, to secondarily analyze a high-cycle component of the fluctuations in fluid temperature occurring at any points of interest within the space of the structure,
   thereby generating information on temperature fluctuations at structure surfaces so as to design a structure taking into account effects of fluid temperature fluctuations.

2. The thermal design method of claim 1, wherein said superimposition step includes superimposition of a high-cycle component artificially generated from a series of random digits on the low-cycle component of the fluctuations in fluid temperature obtained by the primary analysis step.

3. A numerical calculation apparatus for analyzing fluid temperature fluctuations that occur within space of structures, comprising:
   (a) storage sections (2) (4) (6) for storing a turbulence model approximately expressing a behavior of turbulence as well as storing a motion equation and an energy equation for fluids which govern the behavior of turbulence;
   (b) calculation sections (2) (4) (6) for performing iterative computation of state variables of a flow area, in accordance with the turbulence model and the motion equation and the energy equation for fluids stored in the storage section, the iterative computation providing a new state variable based on the current state variable, with a given time step size between the new state and the current state; and
   (c) a control section (8) for controlling said time step size, in accordance with the state variables calculated by the calculation sections,
   thereby performing numerical calculations for time-averaged solutions to the motion equation and the energy equation for fluids to analyze the fluid temperature fluctuations.

4. The numerical calculation apparatus of claim 3, wherein the control section (8) includes a fuzzy control section which controls the time step size, in accordance with the relative variation of the state variable calculated by the calculation section.

5. The numerical calculation apparatus of claim 4, wherein the fuzzy control section reduces the time step size when the relative variation is large, and increase the time step size when the relative variation is small.

6. The numerical calculation apparatus of claim 4, wherein the control section (8) appropriately corrects membership functions referenced by the fuzzy control section when degree of improvement in the slope of the relative variation is small.

7. The numerical calculation apparatus of claim 4, wherein, when a plurality of state variables are to be calculated by the calculation section, the fuzzy control section weights the plurality of relative variations related to the state variables and integrates the weighted relative variations, thereby controlling the time step size on the basis of the results of integration.

8. The numerical calculation apparatus of claim 7, wherein said fuzzy control section controls the time step size on the basis of the center of gravity of each element area of fuzzy sets, the area size of each element area having been corrected by multiplying the original element area, to which each of the relative variations belongs, by a grade corresponding to each of the relative variations.

9. The numerical calculation apparatus of claim 8, wherein the control section (8) modifies the membership functions by sliding their positions on the base set.

10. A numerical calculation apparatus for analyzing fluid temperature fluctuations that occur within space of structures, comprising:

(a) storage sections (2) (6) for storing a motion equation and an energy equation for fluids which govern the behavior of turbulence;

(b) calculation sections (2) (6) for performing numerical calculations, through direct simulation, to solve the motion equation and the energy equation which have been stored in the storage section, and based on calculation results, for performing iterative computation of the state variables of a flow area to provide a new state variable based on the current state variable, with a given time step size between the new state and the current state; and (c) a control section (10) for controlling the time step size, in accordance with the state variables calculated by the calculation sections, thereby performing numerical calculations for accurate solutions to the motion equation and the energy equation for fluids to analyze the fluid temperature fluctuations.

11. The numerical calculation apparatus of claim 10, wherein said control section (10) comprises:

a fuzzy control section for controlling the time step size in accordance with the relative variation of the state variables calculated by the calculation section;

an inference section for inferring in advance locations of areas in which physically meaningful vibrations may occur, using general rules related to fluid behavior; and an adjustment section for adjusting the time step size, only when vibrations appear in state variables during the calculations for those areas which have not been inferred by the inference section as the areas in which the physically meaningful vibrations may occur.

12. The numerical calculation apparatus of claim 11, wherein the inference section infers the locations of areas where the vibrations may occur, on the basis of the distance from a solid wall constituting a structure.

13. The numerical calculation apparatus of claim 11, wherein, in the presence of a plurality of walls constituting a structure, the inference section weights the respective distances from the walls and integrates the weighted distances to infer the locations of the areas where the vibrations may occur.

14. The numerical calculation apparatus of claim 13, wherein the inference section infers the locations of areas where vibrations may occur on the basis of the center of gravity of each element area of fuzzy sets, the area size of each element area having been corrected by multiplying the original element area, to which the respective distances belong, by a grade corresponding to each of the relative distances.

* * * * *